June 13, 1967  R. A. ENGLANDER ETAL  3,325,131
RAIL MOUNTING MEANS
Filed June 25, 1965
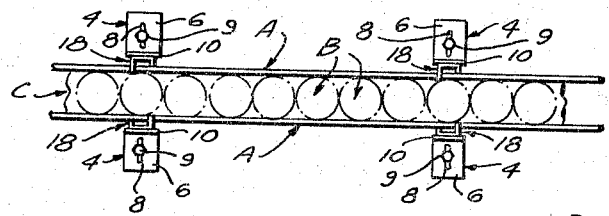
FIG.1
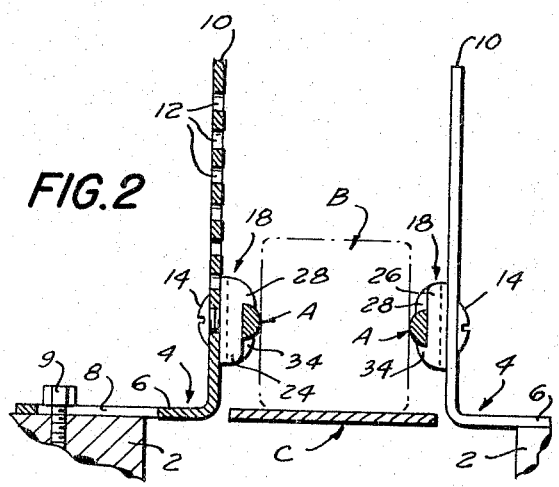
FIG.2
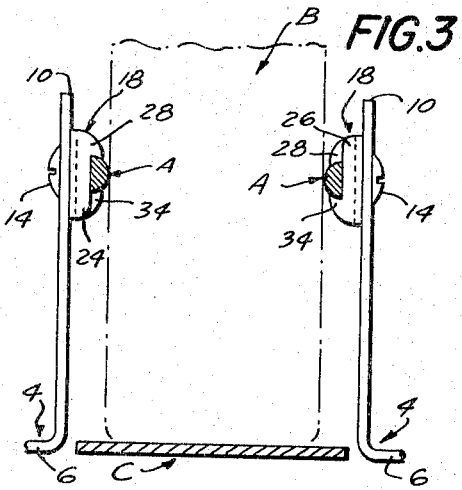
FIG.3
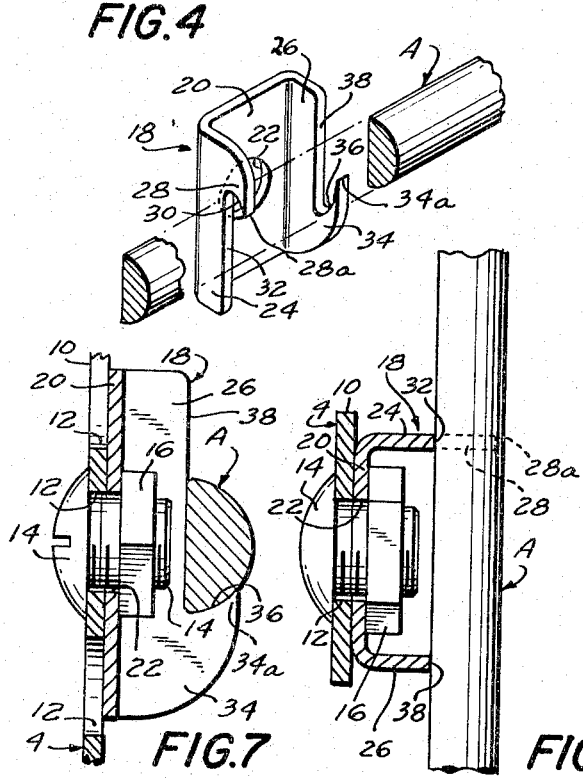
FIG.4
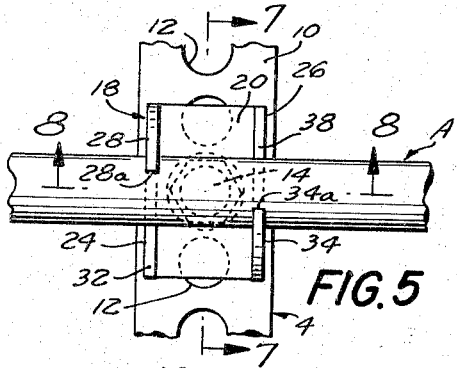
FIG.5
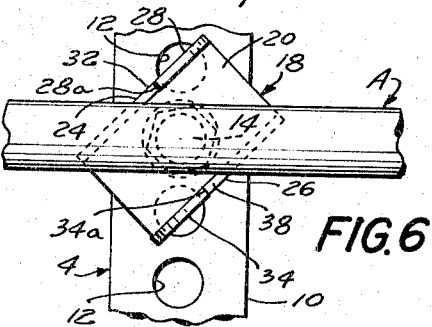
FIG.6
FIG.7  FIG.8
INVENTORS
ROBERT A. ENGLANDER
CARROLL B. MESSER, III
BY
James and Franklin
ATTORNEY

United States Patent Office 3,325,131
Patented June 13, 1967

3,325,131
RAIL MOUNTING MEANS
Robert A. Englander and Carroll B. Messer III, both of Lynchburg, Va., assignors to Simplimatic Engineering Co., Lynchburg, Va.
Filed June 25, 1965, Ser. No. 466,936
7 Claims. (Cl. 248—251)

The present invention relates to a construction which facilitates the mounting of elongated rails or guides at desired positions.

Guide rails are commonly employed in various applications, including the conveying of containers such as cans or bottles from one place to another. In many instances the specific location of the guide rails, and particularly their elevation, must be changed from time to time in order to adapt to changes in the character of the containers being conveyed. Thus guide rails which are at a proper height for short containers may well be too low for tall containers, and vice versa. Even with containers of the same size, changes in vertical location of the guide rails may be required because of different placement of labels or the like on those containers, which labels might be rubbed off or damaged if they made contact with the guide rails.

However, adjustment of the vertical position of a guide rail is not as easy as it sounds. It must be borne in mind that such rails are often quite long, so that simultaneous vertical adjustment of the rail along its entire length is extremely difficult to accomplish.

What has been done in the past is to provide brackets having openings through which the guide rail must be axially inserted. For initial positioning of the guide rail the brackets are positioned with their openings in line and then the guide rail is threaded through those openings. When adjustment of the vertical position of the guide rail is required, the rail is pulled out from the bracket openings, the brackets are repositioned, and the guide rail is then threaded back through the openings. This is obviously a difficult and time-consuming task.

The prime object of the present invention is to provide a structure which will facilitate the mounting of guide rails on supporting structure, and which in particular will not require the laborious and difficult threading operation characteristic of the most common structures of the prior art. The mounting structure, in accordance with the present invention, is so designed that the guide rail can be removed therefrom or presented thereto in a direction away from or toward the front face thereof. The guide rail is adapted either to be held securely on said structure or to be readily removed therefrom, depending upon easily accomplished manipulation of that structure.

The mounting structure comprises a base which is rotatably mounted on an axis member extending out from a support. Extending from the base are a pair of wall portions terminating in lower and upper edges respectively which are vertically spaced from one another by a distance corresponding to the height and shape of the guide rail to be mounted thereon, the wall portions being laterally spaced from one another substantially in the direction that the guide rail is to extend by a distance greater than the height of said guide rail. The spaces below said lower edge and above said upper edge are unobstructed for at least a substantial distance from said edges respectively. Hence when the mounting structure is rotated so that the wall portions in question are not perpendicular to the direction that the guide rail is to extend, the guide rail can readily be moved in a direction at right angles to its length so as to be received between the two wall portions in question. When the mounting structure is then rotated to bring those wall portions into or toward a position substantially at right angles to the axis of the guide rail, the aforementioned lower and upper edges of said wall portions will engage the guide rail and hold it in position, those edges preferably being formed so as to urge the guide rail inwardly toward the base of the mounting structure. When the guide rail is to be removed the mounting structure is rotated so that said wall portions again incline toward the axis of the guide rail, and the guide rail can then be removed in a direction at right angles to its length, and hence in a direction perpendicular to the face of the mounting structure.

The structure in question is extremely easily and inexpensively manufactured and need not be made to any high degree of dimensional tolerance. While it may be designed to receive and hold guide rails of particular shape and size, its construction is such that it will inherently adapt itself for effective use with guide rails of different sizes and shapes.

When, as is here specifically disclosed, the axis member on which the mounting structure is rotatably mounted comprises a screw, the rotation of the screw when it is tightened is in such a direction as to cause the mounting structure to be rotated more firmly into its guide-rail-securing position.

To the accomplishment of the above, and to such other objects as may hereinafter appear, the present invention relates to the construction of mounting means for a rail or the like as defined in the appended claims and as described in this specification, taken together with the accompanying drawings, in which:

FIG. 1 is a top plan view, on a greatly reduced scale, of a typical application where the present invention may be used, to wit, in holding guide rails which define a conveyor line for a plurality of cans;

FIG. 2 is a partially cross sectioned end view of the conveyor line of FIG. 1, showing guide rails held in place by the structure of the present invention at a low elevation appropriate to the guiding of short containers;

FIG. 3 is a view similar to FIG. 2, but showing the guide rails in an elevated position appropriate to the guiding of tall containers;

FIG. 4 is a three-quarter perspective view of the mounting clip of the present invention, the guide rail associated therewith being shown partially in phantom;

FIG. 5 is a front elevational view of the mounting structure of the present invention in position holding a rail;

FIG. 6 is a view similar to FIG. 5, but showing the mounting clip rotated so as to release the rail; and FIGS. 7 and 8 are cross sectional views on an enlarged scale, taken along the lines 7—7 and 8—8 respectively of FIG. 5.

As has been indicated the invention is here specifically illustrated in connection with the mounting of guide rails generally designated A in order to laterally confine a row of containers generally designated B as those containers are moved from one location to another, as by the use of the endless conveyor belt C. Disposed along the desired path of movement of the containers B are a plurality of posts 2 or other structural members on which L-shaped supports generally designated 4 are mounted, those supports having horizontal portions 6 which rest on the upper surfaces of the posts 2 and which are provided with elongated slots 8 through which the post-supported screws 9 pass, thereby permitting the position of the supports 4 to be adjusted toward and away from the belt C. The supports 4 include vertically extending portions 10 provided with a plurality of vertically spaced apertures 12. The axis member, defined by a screw 14, is adapted to be inserted through the appropriate aperture 12, depending upon the desired height for the guide rail A, and is secured in place by means of a cooperating nut 16.

A clip generally designated 18 is mounted on that surface of the upwardly extending portion 10 of the support 4 which is directed toward the conveyor belt C. This clip comprises a base 20 provided with an opening 22 through which the screw 14 is adapted to pass, the screw 14 therefore rotatably mounting the clip 18 on the support 4. Extending from the base 20 substantially at right angles thereto away from the support 4 are a pair of walls 24 and 26, which walls are laterally spaced from one another (in the direction that the guide rail A is to extend) and are located on opposite sides of the aperture 22. Projecting forwardly from the upper part of the wall 24 is a wall portion 28 which terminates in a downwardly facing concave lower edge 30 which communicates with the outwardly facing vertical edge 32 of the wall 24. Projecting forwardly from the lower part of the wall 26 is a wall portion 34 which terminates in an upwardly facing concave upper edge 36, which communicates with the outwardly facing vertical edge 38 of the wall 26. The space beneath the lower edge 30 of the wall portion 28 is unobstructed for at least a substantial distance therebelow, and the space above the upper edge 36 of the wall portion 34 is similarly unobstructed. The edges 30 and 36 are vertically spaced relative to one another by a distance corresponding at least approximately to the height and shape of the guide rail A to be mounted thereon, with their highest and lowest points respectively spaced vertically a distance at least as great as the height of the rail A, and with their lowest and highest tips 28A and 34A respectively spaced vertically a distance less than the height of the rail A.

As here specifically disclosed the cross sectional shape of the guide rail A is essentially half round, and the edges 30 and 36 are correspondingly shaped, each of those edges constituting an arc of a circle having essentially the same radius as does the curved surface of the guide rail A.

When the conveyor system disclosed is to convey short containers B, as shown in FIG. 2, the clips 18 are mounted in appropriate lower apertures 12 of the vertical portions 10 of the supports 4 by means of the screws 14. When the clips 18 are in their vertical position shown in FIG. 5, with their walls 24 and 26 and the wall portions 28 and 34 substantially at right angles to the length of the guide rail A, the vertical distance between those tips 28A and 34A is less than the height of the guide rail A. The guide rail A cannot be engaged under those conditions. However, when the clips 18 are rotated clockwise relative to the vertical portions 10 of the supports 4 so that their walls 24 and 26, and the wall portions 28 and 34, make an acute angle with the direction that the guide rail A is to extend (see FIG. 6) the spaces between the tips 28A and 34A of the wall portions 38 and 34 are widened to a distance greater than the height of the guide rail A. This occurs because the lateral spacing between the wall portions 28 and 34 is greater than the height of the guide rail A. As a result, the guide rail A may be pushed up against the edges 32 and 38 of the walls 24 and 26 respectively by being moved in a direction into the plane of the paper as shown in FIG. 6, that is to say, in a direction perpendicular to the axis of the guide rail A, or parallel to the axis of the screw 14. Once the guide rail A has been thus positioned, the clip 18 is then rotated in a counter-clockwise direction as viewed in FIG. 6 back to its position shown in FIG. 5. With this rotation the wall portion tips 28A and 34A engage portions of the outer surface of the guide rail A and hold it in position, since then, as has already been noted, the wall portion tips 28A and 34A are vertically spaced from one another by a distance less than the height of the guide rail A.

The walls 24 and 26 extend out from the base 20 by a distance greater than the height of the screw 14 and nut 16 received thereon, thereby preventing interference between that screw and nut and the guide rail A. The orientation of the edges 30 and 36 of the wall portions 28 and 34 respectively is such as to tend to wedge the guide rail A against the wall edges 32 and 38 of the walls 24 and 26 respectively, thus reliably holding the guide rail A in position. It will be appreciated that with this wedging action it is not essential that the shape of the edges 30 and 36 conform exactly to the shape of the engaged surface of the guide rail A. Moreover, it will be appreciated that a given size clip 18 can be used with guide rails A having heights which differ to an appreciable degree. The minimum height guide rail with which a given clip 18 can be associated is virtually unlimited; as the clip 18 is turned in a counter-clockwise direction from the position shown in FIG. 5 its surfaces 30 and 36 are moved vertically closer to one another, so that the clip 18 is capable of grasping guide rails much smaller in height than the rail A shown in that figure. The maximum height of the guide rail usable with a given clip 18 is determined essentially by the lateral spacing between the wall portions 28 and 34; a guide rail A having a height greater than that distance could not be fitted between the wall portions 28 and 34 even if the clip 18 is rotated a full 90° from its position shown in FIG. 5. A given clip 18 can, however, function effectively with guide rails having heights falling between the minimum and maximum heights thus set forth.

It is preferred, in the use of the clip of the present invention, that when the screw 14 is tightened to clamp the clip in position, it tends to rotate the clip 18 further toward its rail-engaging position. Hence, as shown in FIG. 6, the clip 18 is rotated in a clockwise direction for guide rail release or reception, and is rotated in a counter-clockwise direction to grasp and hold the guide rail in position.

When a series of tall containers B are needed, as shown in FIG. 3, all that need be done is to rotate the clips 18 to their angular position shown in FIG. 6, remove the guide rail A therefrom in the direction of the axis of the screws 14, reposition the clips 18 at desired height, again place the guide rail A into position on the clips 18 as shown in FIG. 6, and then rotate the clips to the vertical position shown in FIG. 5. The clips 18, it will be observed, will provide a support for the guide rail A even when in the position shown in FIG. 6—the rail A will by gravity rest within the concave surface 36—thus facilitating the locating of the rail A followed by sequential rotating of the clips 18. It is noteworthy that in all of these manipulations there is no necessity for the threading of the guide rail A through recesses in the direction of the axis of that guide rail A.

The clip 18 may readily be stamped from sheet stock, after which the walls 24 and 26 and their associated wall portions 28 and 34 are bent up from the base 20. Thus parts may easily be manufactured at very low cost.

While but a single embodiment of the present invention has been here specifically disclosed, it will be apparent that many variations may be made therein, all within the spirit of the invention as described in the following claims.

We claim:
1. Mounting means for a rail or the like comprising a support, an axis member extending from said support, and a clip rotatably mounted on said axis member, said clip comprising a base having an aperture through which said axis member rotatably passes and a pair of walls extending from said base in generally the same direction, one of said walls comprising a first portion located at the upper part of said clip which terminates in a lower edge and the other of said walls comprising a second portion located at the lower part of said clip which terminates in an upper edge, said wall portions being spaced from one another laterally of said base, said edges being vertically spaced from one another by a predetermined distance, the spaces below said edge of said first portion and above said edge of said second portion being unobstructed for a distance which is greater than said predetermined distance.

2. The rail mounting means of claim 1, in which said edges define wedge means adapted to engage said rail and urge said rail toward said base when said clip is rotated on said axis member so as to bring said edges into engagement with said rail.

3. The rail mounting means of claim 2, in which said walls comprise parts which extend from said base, said first and second wall portions extending out beyond said parts respectively, said parts extending from said base along vertical distances at least substantially equal to the heights of the wall portions associated therewith plus said predetermined distance, vertically overlapping one another, and having exposed outer edges at said vertical spacing between said portion edges respectively, whereby said clip is adapted to hold said rail against said exposed outer edges of said wall parts below and above said first and second wall portions respectively.

4. The rail mounting means of claim 1, in which said walls comprise parts which extend from said base, said first and second wall portions extending out beyond said parts respectively, said parts extending from said base along vertical distances at least substantially equal to the heights of the wall portions associated therewith plus said predetermined distance, vertically overlapping one another, and having exposed outer edges at said vertical spacing between said portion edges respectively, whereby said clip is adapted to hold said rail against said exposed outer edges of said wall parts below and above said first and second wall portions respectively.

5. Mounting means for a rail or the like comprising a support, an axis member extending from said support, and a clip rotatably mounted on said axis member, said clip comprising a base having an aperture through which said axis member rotatably passes and a pair of walls extending from said base in generally the same direction, one of said walls comprising a first portion located at the upper part of said clip which terminates in a lower edge and the other of said walls comprising a second portion located at the lower part of said clip which terminates in an upper edge, said edges being concave, said wall portions being spaced from one another laterally of said base and disposed on opposite sides of said aperture, said edges being vertically spaced from one another by a predetermined distance, the spaces below said edge of said first portion and above said edge of said second portion being unobstructed for a distance which is greater than said predetermined distance.

6. Mounting means for a rail or the like comprising a support, an axis member extending from said support, and a clip rotatably mounted on said axis member, said clip comprising a base having an aperture through which said axis member rotatably passes and a pair of walls extending from said base in generally the same direction, one of said walls comprising a first portion located at the upper part of said clip which terminates in a lower edge and the other of said walls comprising a second portion located at the lower part of said clip which terminates in an upper edge, said wall portions being spaced from one another laterally of said base, said edges being vertically spaced from one another by a predetermined distance, said wall portions extending out from said base beyond all other parts of said clip, said walls comprising parts which extend from said base, said first and second wall portions extending out beyond said parts respectively, said parts extending from said base along vertical distances at least substantially equal to the heights of the wall portions associated therewith plus said predetermined distance, vertically overlapping one another, and having exposed outer edges at said vertical spacing between said portion edges respectively, whereby said clip is adapted to hold said rail against said exposed outer edges of said wall parts below and above said first and second wall portions respectively.

7. Mounting means for a rail or the like comprising a support, an axis member extending from said support, and a clip rotatably mounted on said axis member, said clip comprising a base having an aperture through which said axis member rotatably passes and a pair of walls extending from said base in generally the same direction, one of said walls comprising a first portion located at the upper part of said clip which terminates in a lower edge and the other of said walls comprising a second portion located at the lower part of said clip which terminates in an upper edge, said edges being concave, said wall portions being spaced from one another laterally of said base and disposed on opposite sides of said aperture, said edges being vertically spaced from one another by a predetermined distance, said wall portions extending out from said base beyond all other parts of said clip, said walls comprising parts which extend from said base, said first and second wall portions extending out beyond said parts respectively, said parts extending from said base along vertical distances at least substantially equal to the heights of the wall portions associated therewith plus said predetermined distance, vertically overlapping one another, and having exposed outer edges at said vertical spacing between said portion edges respectively, whereby said clip is adapted to hold said rail against said exposed outer edges of said wall parts below and above said first and second wall portions respectively.

References Cited
UNITED STATES PATENTS

| | | | |
|---|---|---|---|
| 752,341 | 2/1904 | Hopkins et al. | 193—38 |
| 822,994 | 6/1906 | Shuflin et al. | 287—49 |
| 1,208,848 | 12/1916 | Small | 193—38 |
| 1,808,628 | 6/1931 | Bond | 248—263 |
| 3,077,969 | 2/1963 | Raffe | 193—38 |

CHANCELLOR E. HARRIS, *Primary Examiner.*

CLAUDE A. LEROY, *Examiner.*

J. F. FOSS, *Assistant Examiner.*